US012124826B2

(12) United States Patent
Han et al.

(10) Patent No.: US 12,124,826 B2
(45) Date of Patent: Oct. 22, 2024

(54) INSTRUMENTATION-BASED DETECTION OF ACCIDENTAL ALGORITHMIC COMPLEXITY OF A PROCEDURE

(71) Applicant: Microsoft Technology Licensing, LLC, Redmond, WA (US)

(72) Inventors: Liqi Han, Redmond, WA (US); Patrick Lothian Nelson, Redmond, WA (US); Nikolaus Lee Karpinsky, Melbourne, FL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 18/095,523

(22) Filed: Jan. 10, 2023

(65) Prior Publication Data
US 2024/0231782 A1 Jul. 11, 2024

(51) Int. Cl.
*G06F 8/41* (2018.01)
(52) U.S. Cl.
CPC ................................. *G06F 8/4441* (2013.01)
(58) Field of Classification Search
None
See application file for complete search history.

(56) References Cited

U.S. PATENT DOCUMENTS

| | | | | |
|---|---|---|---|---|
| 6,049,666 A * | 4/2000 | Bennett | ................ | G06F 11/323 |
| | | | | 714/E11.181 |
| 6,598,221 B1 * | 7/2003 | Pegatoquet | ......... | G06F 11/3466 |
| | | | | 714/E11.2 |
| 6,934,935 B1 * | 8/2005 | Bennett | ............... | G06F 11/3466 |
| | | | | 714/E11.181 |
| 8,856,767 B2 * | 10/2014 | Jalan | ................... | G06F 11/3419 |
| | | | | 717/157 |
| 10,872,025 B1 * | 12/2020 | Wu | .......................... | G06F 8/75 |
| 2010/0199266 A1 * | 8/2010 | Warren | ............... | G06F 11/3409 |
| | | | | 717/133 |

(Continued)

OTHER PUBLICATIONS

Gafter, Neal, "Accidentally Quadratic Constant Folding", Retrieved From: https://accidentallyquadratic.tumblr.com/, Retrieved From: Jun. 22, 2022, 15 Pages.

(Continued)

*Primary Examiner* — Philip Wang
(74) *Attorney, Agent, or Firm* — Wade IP Law PLLC

(57) ABSTRACT

Techniques are described herein that are capable of detecting accidental algorithmic complexity of a procedure by using instrumentation. A number of times a parent procedure calls a child procedure during each of multiple executions of the parent procedure is detected by using instrumentation to provide call counts for the respective executions. A value of an attribute of the parent procedure during each of the executions is detected by using the instrumentation to provide attribute values for the respective executions. A function is generated that defines a curve that estimates a relationship between the attribute values for the respective executions and the call counts for the respective executions. Based at least on a slope of the curve, accidental algorithmic complexity of the parent procedure is determined. Based at least on the accidental algorithmic complexity satisfying a complexity criterion, a remedial action is performed with regard to the accidental algorithmic complexity.

22 Claims, 8 Drawing Sheets

(56) References Cited

U.S. PATENT DOCUMENTS

| | | | |
|---|---|---|---|
| 2012/0054721 A1* | 3/2012 | Dadiomov | G06F 11/3466 |
| | | | 717/131 |
| 2012/0278793 A1* | 11/2012 | Jalan | G06F 11/3466 |
| | | | 717/158 |
| 2020/0065077 A1* | 2/2020 | Inagaki | G06F 11/3006 |
| 2020/0242007 A1* | 7/2020 | Davis | G06F 11/366 |
| 2023/0325299 A1* | 10/2023 | Nelson | G06F 11/3644 |
| | | | 717/130 |

OTHER PUBLICATIONS

Binder, et al., "Platform-independent profiling in a virtual execution environment", Software-Practice and Experience, vol. 39, Issue No. 1, 2009, pp. 47-79.

International Search Report and Written Opinion received for PCT Application No. PCT/US2023/086326, May 2, 2024, 16 pages.

* cited by examiner

```
Function A(N) {
   for N {
      B(N);
   }
}
Function B(N) {
   for N {
      sleep(1s);
   }
}
```

| N | Elapsed time of A | Call count of B in A |
|---|---|---|
| 1 | 1 | 1 |
| 2 | 4 | 2 |
| 3 | 9 | 3 |
| 4 | 16 | 4 |
| 5 | 25 | 5 |

```
Function A(N) {
  for N {
    for N {
      B();
    }
  }
}
Function B() {
  sleep(1s);
}
```

| N | Elapsed time of A | Call count of B in A |
|---|---|---|
| 1 | 1 | 1 |
| 2 | 4 | 4 |
| 3 | 9 | 9 |
| 4 | 16 | 16 |
| 5 | 25 | 25 |

INSTRUMENTATION-BASED DETECTION OF ACCIDENTAL ALGORITHMIC COMPLEXITY OF A PROCEDURE

BACKGROUND

Algorithmic complexity represents an amount of resources (e.g., time or space) that execution of a procedure (e.g., an algorithm) consumes. Traditionally, the algorithmic complexity is calculated to equal the amount of resources consumed by the procedure during its execution divided by the size of the input that is received by the procedure. For instance, the amount of resources consumed by the procedure during its execution may be the number of steps that the procedure performs during its execution or the number of storage locations that the procedure uses during its execution.

A relatively low algorithmic complexity or a relatively slow increase in the algorithmic complexity as the size of the input is increased may indicate that the procedure is relatively efficient. A relatively high algorithmic complexity or a relatively fast increase in the algorithmic complexity as the size of the input is increased may indicate that the procedure is relatively inefficient.

Algorithmic complexity of a procedure may be inherent or accidental. Inherent algorithmic complexity of the procedure is algorithmic complexity caused by an attribute of the procedure that is essential to achieve an end result of the procedure. Accidental algorithmic complexity of the procedure is algorithmic complexity caused by an attribute of the procedure that is not essential to achieve the end result of the procedure. Accidental algorithmic complexity of procedures traditionally is relatively difficult to detect.

SUMMARY

Procedures that have a relatively high algorithmic complexity may cause glitches (e.g., delays) during their execution that are noticeable to a user. It may be desirable to identify accidental algorithmic complexity of a procedure because the accidental algorithmic complexity is, by definition, caused by an attribute of the procedure that is not essential to achieve an end result of the procedure. Thus, by identifying the accidental algorithmic complexity of the procedure, a remedial action may be performed with regard to the accidental algorithmic complexity if the accidental algorithmic complexity is deemed to be too high. For instance, an alert may be generated, non-essential attribute(s) of the procedure that cause the accidental algorithmic complexity to be too high may be flagged, a change to any one or more (e.g., all) of the non-essential attribute(s) may be recommended or automatically implemented, and so on.

Various approaches are described herein for, among other things, detecting accidental algorithmic complexity of a procedure by using instrumentation. Examples of a procedure include but are not limited to a basic block, a code path, and a jump to a block of code. A basic block is a group (e.g., set) of contiguous instructions that has one entry point and one exit point. It will be recognized that one or more blocks may be included between braces in a function. A code path is a group of instructions that is executed during a single run of a computer program or a fragment thereof. Examples of accidental algorithmic complexity include but are not limited to accidental time complexity and accidental storage complexity. Accidental time complexity of a procedure is a representation of an extent to which an elapsed time of the execution of the procedure increases as a number of inputs of the procedure is increased. The number of inputs of the procedure may be estimated by a call count of the procedure. A call count of a procedure is a number of times the procedure calls other procedure(s) during execution of the procedure. Accordingly, the accidental time complexity of the procedure may be estimated based on (e.g., based at least on) an extent to which the elapsed time of the execution of the procedure increases as the call count of the procedure increases. Accidental storage complexity of a procedure is a representation of an extent to which an amount of storage (a.k.a. a storage amount) that the procedure consumes during execution of the procedure increases as a number of inputs of the procedure is increased. Because the number of inputs of the procedure may be estimated by the call count of the procedure, the accidental storage complexity of the procedure may be estimated based on an extent to which the storage amount of the procedure increases as the call count of the procedure increases.

Instrumentation is a process of modifying a procedure to gather information about the procedure. For example, the procedure may be modified by inserting instructions (e.g., a code snippet) into the procedure, and the instructions may be configured to gather the information. The gathered information may include a start time of the procedure, an end time of the procedure, a start time of another procedure that is called by the procedure, an end time of another procedure that is called by the procedure, an amount of storage that is consumed during an execution of the procedure, and so on. A start time of a procedure is a time instance at which execution of the procedure begins. An end time of a procedure is a time instance at which execution of the procedure ends. Accidental algorithmic complexity as determined in accordance with the example techniques described herein differs from algorithmic complexity as determined in accordance with conventional techniques. As indicated above, the accidental algorithmic complexity as described herein is determined by using instrumentation. For instance, a number of times a procedure calls other procedure(s) during each of its executions may be determined using instrumentation. An amount of resource(s) that the procedure consumes during each of its executions may be determined using the instrumentation. The accidental algorithmic complexity of the procedure may be determined by comparing a representation of the amount of resource(s) that the procedure consumes during each of its executions and a representation of the number of times the procedure calls the other procedure(s) during each of its executions.

A procedure that calls another procedure is referred to herein as a "parent procedure" with regard to the called procedure, and the called procedure is referred to herein as a "child procedure" with regard to the calling (i.e., parent) procedure.

In an example time-based approach, a number of times a parent procedure calls a child procedure during each of multiple executions of the parent procedure is detected by using instrumentation to provide call counts for the respective executions. An amount of time that the parent procedure executes during each of the executions is detected by using the instrumentation to provide elapsed times for the respective executions. A function is generated that defines a curve that estimates a relationship between the elapsed times for the respective executions and the call counts for the respective executions. Based at least on a slope of the curve that is defined by the function, accidental time complexity of the parent procedure is determined. Based at least on the accidental time complexity of the parent procedure satisfying a complexity criterion, a remedial action is performed with regard to the accidental time complexity.

In an example storage-based approach, a number of times a parent procedure calls a child procedure during each of multiple executions of the parent procedure is detected by using instrumentation to provide call counts for the respective executions. An amount of storage that the parent procedure consumes during each of the executions is detected by using the instrumentation to provide storage amounts for the respective executions. A function is generated that defines a curve that estimates a relationship between the storage amounts for the respective executions and the call counts for the respective executions. Based at least on a slope of the curve that is defined by the function, accidental storage complexity of the parent procedure is determined. Based at least on the accidental storage complexity of the parent procedure satisfying a complexity criterion, a remedial action is performed with regard to the accidental storage complexity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
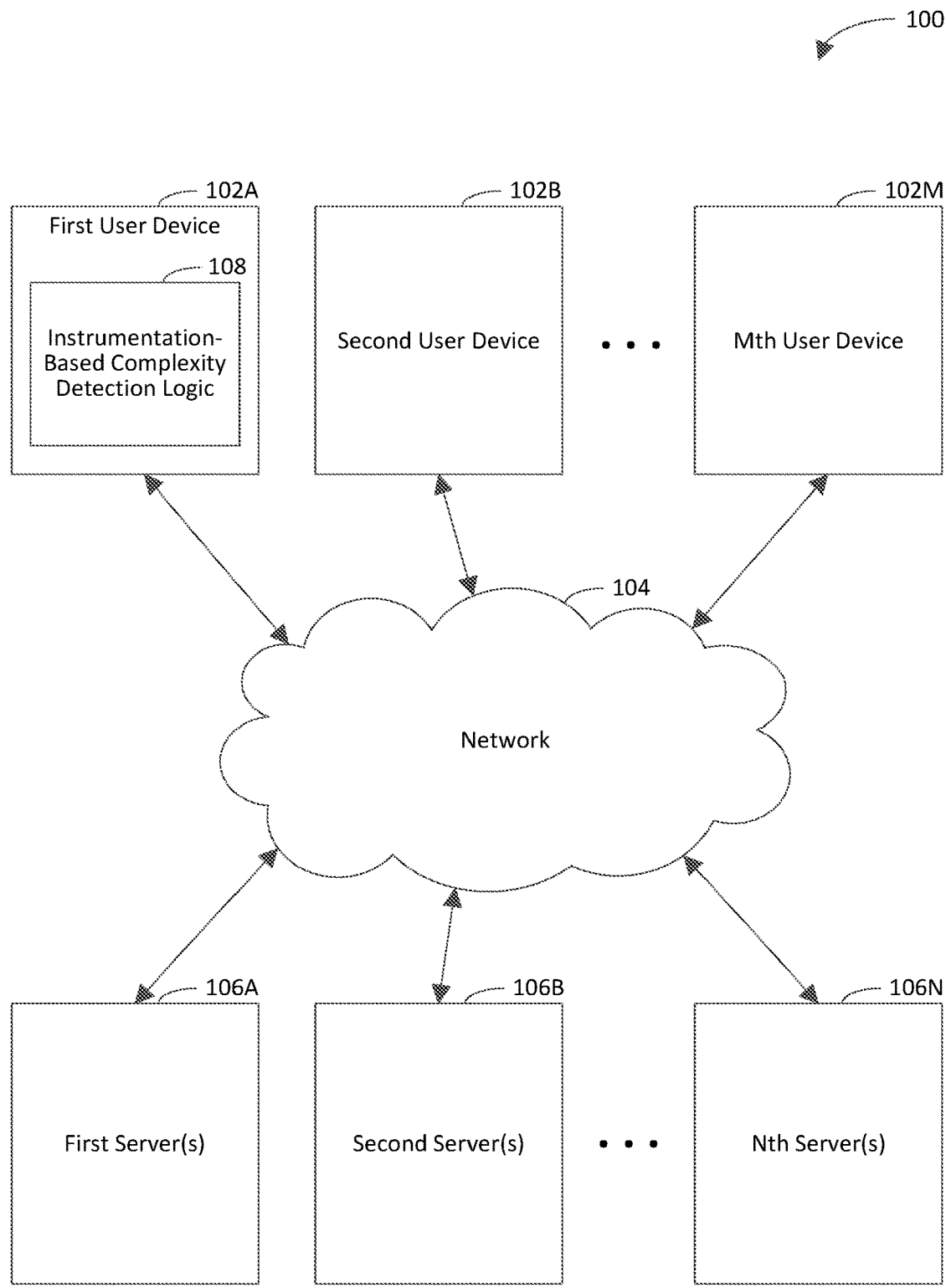
FIG. 1 is a block diagram of an example instrumentation-based complexity detection system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

Procedures that have a relatively high algorithmic complexity may cause glitches (e.g., delays) during their execution that are noticeable to a user. It may be desirable to identify accidental algorithmic complexity of a procedure because the accidental algorithmic complexity is, by definition, caused by an attribute of the procedure that is not essential to achieve an end result of the procedure. Thus, by identifying the accidental algorithmic complexity of the procedure, a remedial action may be performed with regard to the accidental algorithmic complexity if the accidental algorithmic complexity is deemed to be too high. For instance, an alert may be generated, non-essential attribute(s) of the procedure that cause the accidental algorithmic complexity to be too high may be flagged, a change to any one or more (e.g., all) of the non-essential attribute(s) may be recommended or automatically implemented, and so on.

Example embodiments described herein are capable of detecting accidental algorithmic complexity of a procedure by using instrumentation. Examples of a procedure include but are not limited to a basic block, a code path, and a jump to a block of code. A basic block is a group (e.g., set) of contiguous instructions that has one entry point and one exit point. It will be recognized that one or more blocks may be included between braces in a function. A code path is a group of instructions that is executed during a single run of a computer program or a fragment thereof. Examples of accidental algorithmic complexity include but are not limited to accidental time complexity and accidental storage complexity. Accidental time complexity of a procedure is a representation of an extent to which an elapsed time of the execution of the procedure increases as a number of inputs of the procedure is increased. The number of inputs of the procedure may be estimated by a call count of the procedure. A call count of a procedure is a number of times the procedure calls other procedure(s) during execution of the procedure. Accordingly, the accidental time complexity of the procedure may be estimated based on (e.g., based at least on) an extent to which the elapsed time of the execution of the procedure increases as the call count of the procedure increases. Accidental storage complexity of a procedure is a representation of an extent to which an amount of storage (a.k.a. a storage amount) that the procedure consumes during execution of the procedure increases as a number of inputs of the procedure is increased. Because the number of inputs of the procedure may be estimated by the call count of the procedure, the accidental storage complexity of the procedure may be estimated based on an extent to which the storage amount of the procedure increases as the call count of the procedure increases.

Instrumentation is a process of modifying a procedure to gather information about the procedure. For example, the procedure may be modified by inserting instructions (e.g., a code snippet) into the procedure, and the instructions may be configured to gather the information. The gathered information may include a start time of the procedure, an end time of the procedure, a start time of another procedure that is called by the procedure, an end time of another procedure that is called by the procedure, an amount of storage that is consumed during an execution of the procedure, and so on. A start time of a procedure is a time instance at which execution of the procedure begins. An end time of a procedure is a time instance at which execution of the procedure ends. Accidental algorithmic complexity as determined in accordance with the example techniques described herein differs from algorithmic complexity as determined in accordance with conventional techniques. As indicated above, the accidental algorithmic complexity as described herein is determined by using instrumentation. For instance, a number of times a procedure calls other procedure(s) during each of its executions may be determined using instrumentation. An amount of resource(s) that the procedure consumes during each of its executions may be determined using the instrumentation. The accidental algorithmic complexity of the procedure may be determined by comparing a representation of the amount of resource(s) that the procedure consumes during each of its executions and a representation of the number of times the procedure calls the other procedure(s) during each of its executions.

A procedure that calls another procedure is referred to herein as a "parent procedure" with regard to the called procedure, and the called procedure is referred to herein as a "child procedure" with regard to the calling (i.e., parent) procedure.

Example techniques described herein have a variety of benefits as compared to conventional techniques for determining algorithmic complexity of a procedure. For instance, the example techniques are capable of reducing an amount of resources (e.g., time, processor cycles, storage, network bandwidth) that is consumed to identify a procedure that exhibits accidental algorithmic complexity, to determine whether the accidental algorithmic complexity is relatively high, to address the relatively high accidental algorithmic complexity (e.g., by performing a remedial action), and/or to execute the procedure (e.g., as a result of modifying the procedure to reduce its accidental algorithmic complexity). For example, by evaluating elapsed times or storage amounts of respective executions of the procedure with reference to call counts of the respective executions, the resources that are consumed by a computing device that identifies the procedure as exhibiting accidental algorithmic complexity, determines whether the accidental algorithmic complexity is relatively high, addresses the relatively high accidental algorithmic complexity, and/or executes the procedure may be reduced. By reducing the amount of resources that is consumed by the computing system, the efficiency of the computing system may be increased.

By evaluating elapsed times or storage amounts of respective executions of a procedure with reference to call counts of the respective executions, the example techniques may increase accuracy, precision, and/or reliability of a determination as to whether a procedure exhibits accidental algorithmic complexity. The increased accuracy, precision, and/or reliability of the determination may increase a user experience of a user of the procedure and/or a developer of a computer program that includes the procedure. The increased accuracy, precision, and/or reliability of the determination may increase a speed with which the developer is able to make the determination, reduce a likelihood of the developer to identify a procedure that does not exhibit accidental algorithmic complexity as exhibiting accidental algorithmic complexity, and/or increase a likelihood of the developer to identify a procedure that exhibits accidental algorithmic complexity as exhibiting accidental algorithmic complexity. It will be recognized that the actions described herein, such as identifying a procedure that exhibits accidental algorithmic complexity, determining whether the accidental algorithmic complexity is relatively high, and addressing (e.g., reducing) the relatively high accidental algorithmic complexity, may be performed automatically (e.g., without involvement of the developer).

By utilizing instrumentation to increase accuracy, precision, and/or reliability of a determination as to whether a procedure exhibits accidental algorithmic complexity, the example techniques may be capable of detecting accidentally quadratic procedures that may be overlooked by conventional techniques as a result of having relatively small input sizes.

FIG. 1 is a block diagram of an example instrumentation-based complexity detection system 100 in accordance with an embodiment. Generally speaking, the instrumentation-based complexity detection system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the instrumentation-based complexity detection system 100 detects accidental algorithmic complexity of a procedure by using instrumentation. Detail regarding techniques for detecting accidental algorithmic complexity of a procedure by using instrumentation is provided in the following discussion.

As shown in FIG. 1, the instrumentation-based complexity detection system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IOT) device, or the like. It will be recognized that any one or more of the user devices 102A-102M may communicate with any one or more of the servers 106A-106N.

The first user device 102A is shown to include instrumentation-based complexity detection logic 108 for illustrative purposes. The instrumentation-based complexity detection logic 108 is configured to detect accidental algorithmic complexity of a procedure by using instrumentation. In a first example implementation, the instrumentation-based complexity detection logic 108 detects a number of times a parent procedure calls a child procedure during each of multiple executions of the parent procedure, by using instrumentation, to provide call counts for the respective executions. The instrumentation-based complexity detection logic 108 detects an amount of time that the parent procedure executes during each of the executions, by using the instrumentation, to provide elapsed times for the respective executions. The instrumentation-based complexity detection logic 108 generates a function that defines a curve that estimates a relationship between the elapsed times for the respective executions and the call counts for the respective executions. Based at least on a slope of the curve that is defined by the function, the instrumentation-based complexity detection logic 108 determines accidental time complexity of the parent procedure. Based at least on the accidental time complexity of the parent procedure satisfying a complexity criterion, the instrumentation-based complexity detection logic 108 performs a remedial action with regard to the accidental time complexity.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the instrumentation-based complexity detection system 100.

The instrumentation-based complexity detection logic 108 may be implemented in various ways to detect accidental algorithmic complexity of a procedure by using instrumentation, including being implemented in hardware, software, firmware, or any combination thereof. For example, the instrumentation-based complexity detection logic 108 may be implemented as computer program code configured to be executed in one or more processors. In another example, at least a portion of the instrumentation-based complexity detection logic 108 may be implemented as hardware logic/electrical circuitry. For instance, at least a portion of the instrumentation-based complexity detection logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the instrumentation-based complexity detection logic 108 may be (or may be included in) a developer tool or a profiler, though the scope of the example embodiments is not limited in this respect. A developer tool is a computer program that performs diagnostic operations (e.g., identifying source of problem, debugging, profiling, controlling, etc.) with respect to program code. Examples of a developer tool include but are not limited to an integrated development environment (IDE) and a web development platform. Examples of an IDE include but are not limited to Microsoft Visual Studio® IDE developed and distributed by Microsoft Corporation; AppCode® IDE, PhpStorm® IDE, Rider® IDE, WebStorm® IDE, etc. developed and distributed by JetBrains s.r.o.; JDeveloper® IDE developed and distributed by Oracle International Corporation; NetBeans® IDE developed and distributed by Sun Microsystems, Inc.; Eclipse™ IDE developed and distributed by Eclipse Foundation; and Android Studio™ IDE developed and distributed by Google LLC and JetBrains s.r.o. Examples of a web development platform include but are not limited to Windows Azure® platform developed and distributed by Microsoft Corporation; Amazon Web Services® platform developed and distributed by Amazon.com, Inc.; Google App Engine® platform developed and distributed by Google LLC; VMWare® platform developed and distributed by VMWare, Inc.; and Force.com® platform developed and distributed by Salesforce, Inc. A profiler is a computer program that measures the performance of another piece of software (e.g., another computer program or a code snippet). It will be recognized that the example techniques described herein may be implemented using a developer tool or a profiler.

The instrumentation-based complexity detection logic 108 is shown to be incorporated in the first user device 102A for illustrative purposes and is not intended to be limiting. It will be recognized that the instrumentation-based complexity detection logic 108 (or any portion(s) thereof) may be incorporated in any one or more of the servers 106A-106N, any one or more of the user devices 102A-102M, or any combination thereof. For example, client-side aspects of the instrumentation-based complexity detection logic 108 may be incorporated in one or more of the user devices 102A-102M, and server-side aspects of instrumentation-based complexity detection logic 108 may be incorporated in one or more of the servers 106A-106N.

Figure 2:
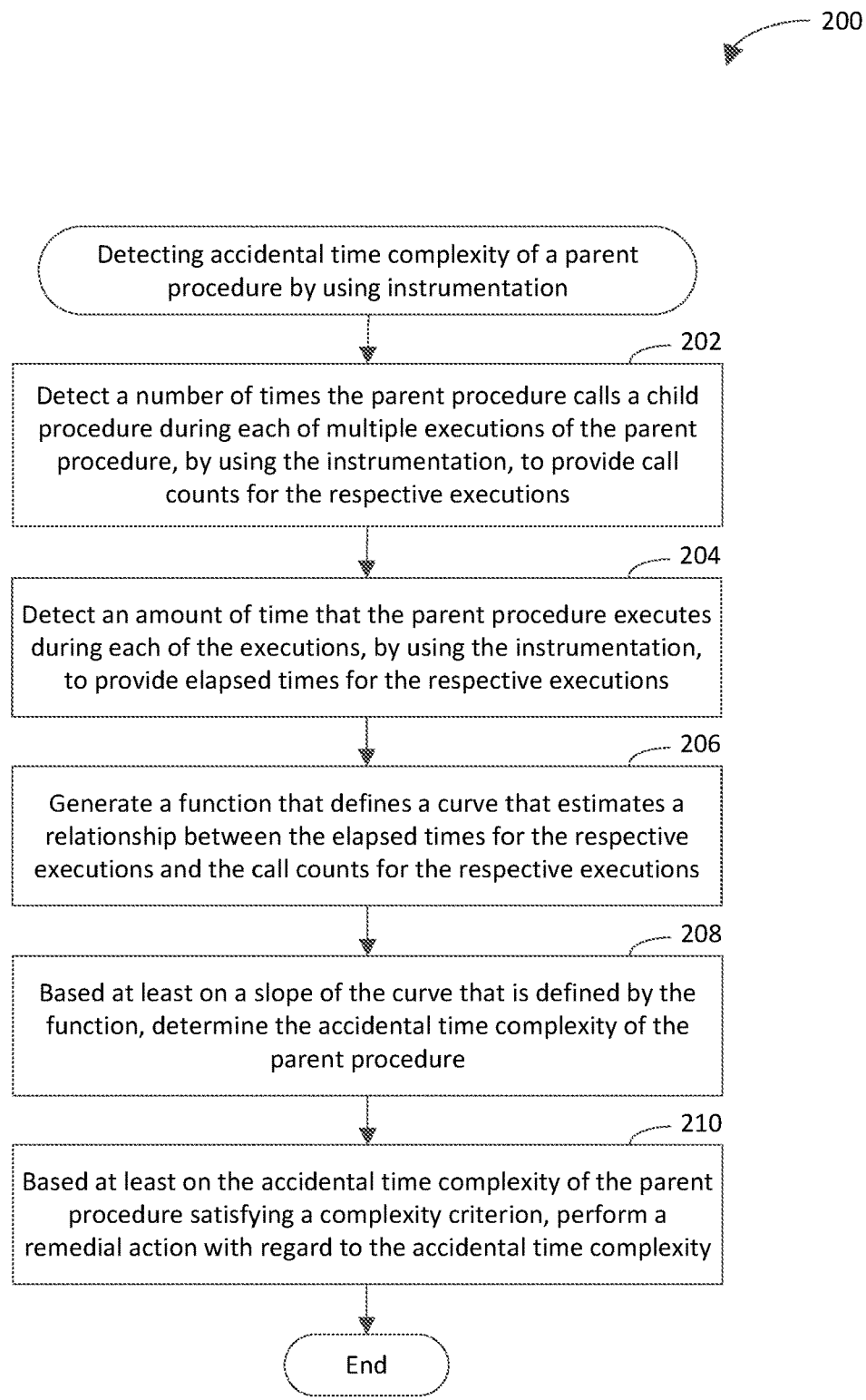
FIG. 2 depicts a flowchart of an example method for detecting accidental time complexity of a parent procedure by using instrumentation in accordance with an embodiment.
Figure 3:
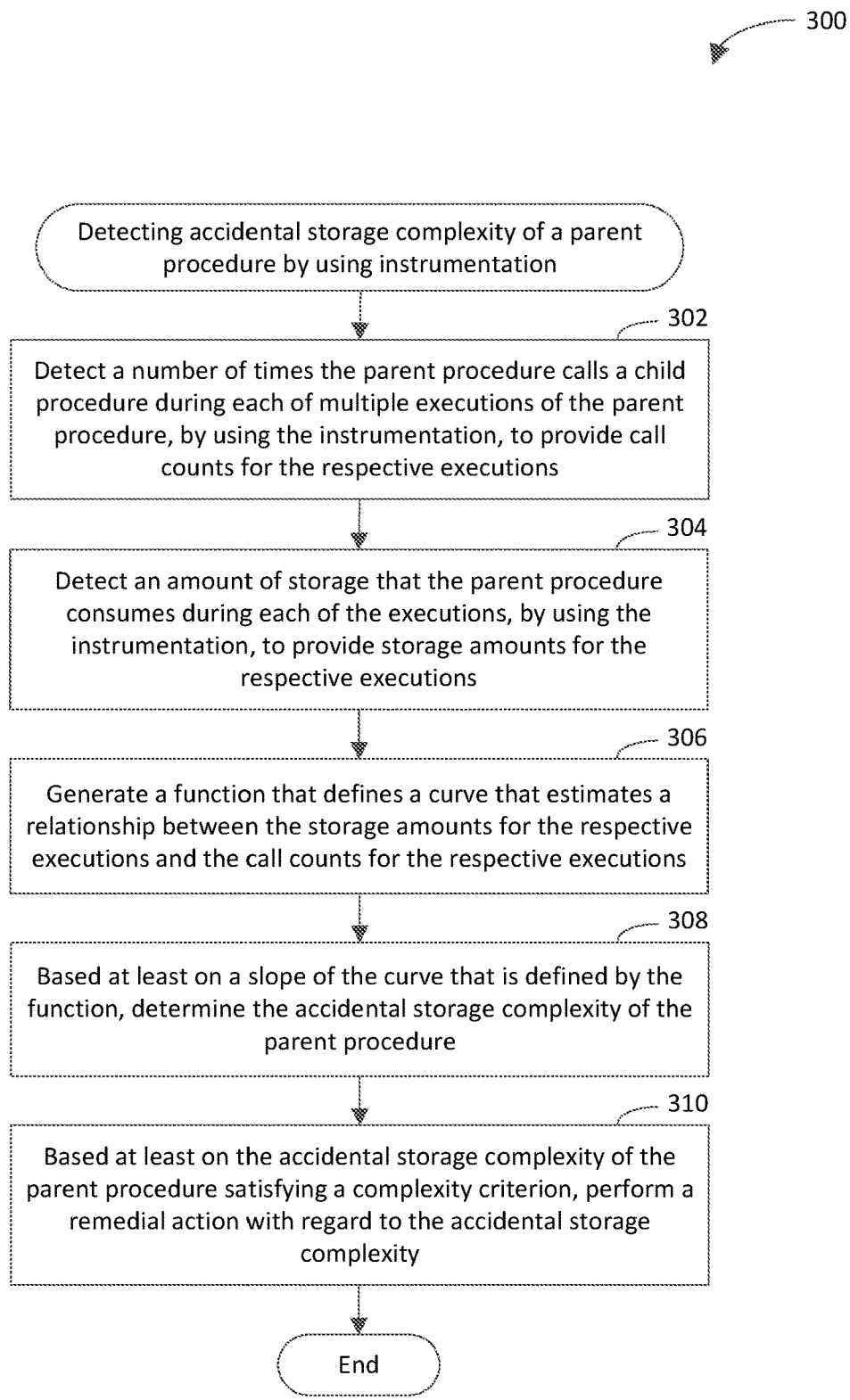
FIG. 3 depicts a flowchart of an example method for detecting accidental storage complexity of a parent procedure by using instrumentation in accordance with an embodiment.
Figure 4:
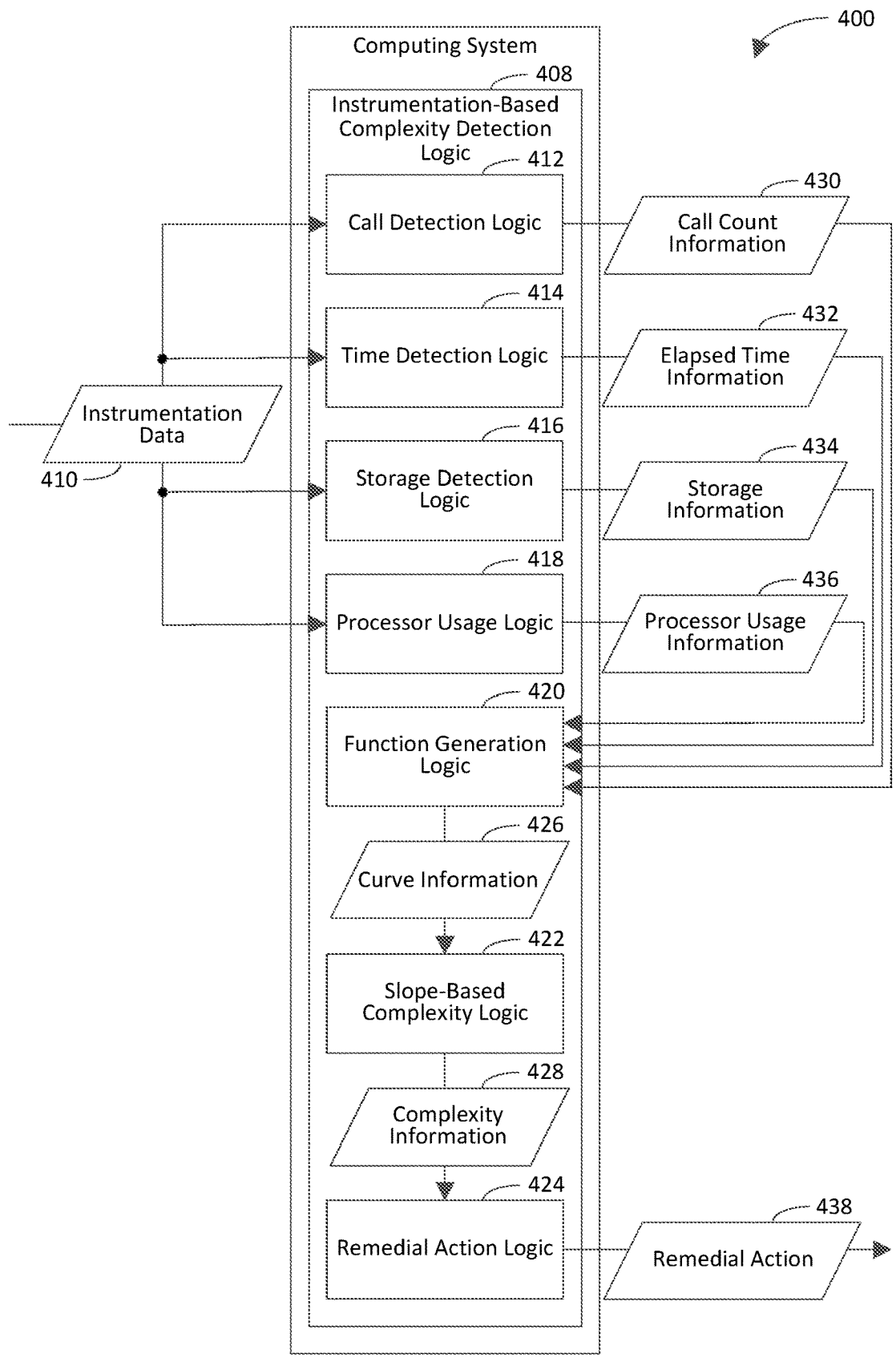
FIG. 4 is a block diagram of an example computing system in accordance with an embodiment.

FIG. 2 depicts a flowchart 200 of an example method for detecting accidental time complexity of a parent procedure by using instrumentation in accordance with an embodiment. FIG. 3 depicts a flowchart 300 of an example method for detecting accidental storage complexity of a parent procedure by using instrumentation in accordance with an embodiment. Flowcharts 200 and 300 may be performed by the first user device 102A shown in FIG. 1, for example. For illustrative purposes, flowcharts 200 and 300 are described with respect to computing system 400 shown in FIG. 4, which is an example implementation of the first user device 102A. As shown in FIG. 4, the computing system 400 includes instrumentation-based complexity detection logic 408. The instrumentation-based complexity detection logic 408 includes call detection logic 412, time detection logic 414, storage detection logic 416, processor usage logic 418, function generation logic 420, slope-based complexity logic 422, and remedial action logic 424. Further structural and operational embodiments will be apparent to persons skilled in the relevant art(s) based on the discussion regarding flowcharts 200 and 300.

As shown in FIG. 2, the method of flowchart 200 begins at step 202. In step 202, a number of times the parent procedure calls a child procedure during each of multiple executions of the parent procedure is detected by using the instrumentation to provide call counts for the respective executions. In an example implementation, the call detection logic 412 analyzes instrumentation data 410 to detect the number of times the parent procedure calls the child procedure during each of the executions of the parent procedure to provide the call counts for the respective executions. The instrumentation data 410 indicates a start time and an end time for each execution of the parent procedure. The instrumentation data 410 identifies each call from the parent procedure to the child procedure and indicates during which execution of the parent procedure each call is made to the child procedure. By using the instrumentation data 410 to cross-reference each call that is made from the parent procedure to the child procedure with the execution of the parent procedure during which the call is made, the call detection logic 412 is able to count the number of times the parent procedure calls the child procedure during each of the executions of the parent procedure. In an aspect of this implementation, the instrumentation data 410 indicates a time instance at which each call from the parent procedure to the child procedure is initiated. In accordance with this example, the call detection logic 412 determines that a call from the parent procedure to the child procedure occurs during a particular execution of the parent procedure by determining that the time instance at which the call is initiated, as indicated by the instrumentation data 410, is within a time period defined by the start time and the end time of the particular execution, as further indicated by the instrumentation data 410. The call detection logic 412 generates call count information 430, which indicates the call counts for the respective executions of the parent procedure.

In an example embodiment, detecting the number of times the parent procedure calls the child procedure during each of the executions of the parent procedure at step 202 includes detecting a number of times the parent procedure initiates a network request during each of the executions of the parent procedure, by using the instrumentation, to provide the call counts for the respective executions.

At step 204, an amount of time that the parent procedure executes during each of the executions is detected by using the instrumentation to provide elapsed times for the respective executions. In an example implementation, the time detection logic 414 analyzes the instrumentation data 410 to detect the amount of time that the parent procedure executes during each of the executions to provide the elapsed times for the respective executions. In an aspect of this implementation, the time detection logic 414 compares the start time of each execution of the parent procedure to the end time of the respective execution of the parent procedure, as indicated by the instrumentation data 410, to determine the amount of time that the parent procedure executes during the respective execution. For instance, the start time and the end time for each execution of the parent procedure may define the amount of time that the parent procedure executes during the respective execution (and therefore the elapsed time for the respective execution). The call detection logic 412 generates elapsed time information 432 to indicate the elapsed times for the respective executions of the parent procedure.

At step 206, a function (e.g., a mathematical function) is generated that defines a curve that estimates a relationship between the elapsed times for the respective executions and the call counts for the respective executions. In an example implementation, the function generation logic 420 generates the function that defines the curve that estimates the relationship between the elapsed times for the respective executions and the call counts for the respective executions. For instance, the function generation logic 420 may configure the function to define the curve of best fit with regard to the elapsed times for the respective executions and the call counts for the respective executions. The function generation logic 420 generates curve information 426, which includes information about the curve. For instance, the curve information 426 indicates a slope of the curve.

In an example embodiment, the curve estimates a relationship between logarithms of the elapsed times for the respective executions and logarithms of the call counts for the respective executions. For example, by collecting a list of (n, T) measurements where n represents a call count for an execution and T represents an elapsed time for the execution, a linear regression may be run on a log-log scale and the function may be defined as $\log(T)=a+b*\log(n)$, which corresponds to $O(n^b)$ in Big O notation. Accordingly, the slope of the curve may be calculated by dividing the logarithms of the elapsed times by the logarithms of the call counts.

At step 208, based at least on a slope of the curve that is defined by the function, the accidental time complexity of the parent procedure is determined. For instance, the accidental time complexity may be determined based at least in part on the slope of the curve being non-linear. In an example implementation, the slope-based complexity logic 422 determines the accidental time complexity of the parent procedure based at least on the slope of the curve, which is indicated by the curve information 426. For example, accidental time complexity of the parent procedure may correspond to (e.g., be defined by) the slope of the curve. In accordance with this example, a slope of one may correspond to (e.g., represent) an accidental time complexity of O(1) using Big O notation; a slope of two may correspond to an accidental time complexity of O(2) using Big O notation, and so on.

In an example embodiment, the accidental time complexity of the parent procedure is agnostic with regard to inputs that are received at the parent function. In accordance with this embodiment, the inputs to the parent function do not affect the accidental time complexity.

At step 210, based at least on the accidental time complexity of the parent procedure satisfying a complexity criterion, a remedial action is performed with regard to the accidental time complexity. In an example implementation, the remedial action logic 424 performs a remedial action 438 with regard to the accidental time complexity as a result of the accidental time complexity of the parent procedure satisfying the complexity criterion. In an aspect of this implementation, the complexity criterion requires the time complexity to be greater than or equal to a time complexity threshold. For example, the complexity criterion may require the slope of the curve to be greater than or equal to a slope threshold. The slope threshold may be any suitable value, such as 2, 2.5, or 3). In another example, the complexity criterion may require a non-linearity of the slope to be greater than or equal to a non-linearity threshold. The non-linearity threshold may be quadratic. For instance, the time complexity threshold may be the slope threshold or the non-linearity threshold.

In an example embodiment, performing the remedial action at step 210 includes triggering a complexity alert, which indicates that the accidental time complexity of the parent procedure satisfies the complexity criterion. In an aspect of this embodiment, the complexity alert indicates an accidental time complexity associated with each line of the parent procedure. In another aspect of this embodiment, the complexity alert indicates an accidental time complexity associated with each line of the parent procedure that causes the accidental time complexity of the parent procedure to satisfy the complexity criterion.

In another example embodiment, performing the remedial action at step 210 includes generating a notification that indicates a portion of the parent procedure that causes the accidental time complexity of the parent procedure to satisfy the complexity criterion. In an aspect of this embodiment, generating the notification includes annotating the parent procedure to indicate the portion that causes the accidental time complexity to satisfy the complexity criterion. For instance, the annotation may be provided proximate the portion.

In yet another example embodiment, performing the remedial action at step 210 includes recommending a change to the parent procedure that is configured to reduce the accidental time complexity of the parent procedure. In a UI example, a description of the change may be presented via a user interface (e.g., a graphical user interface) of the computing device 400. In an aspect of this embodiment, implementation of the change requires approval of an entity associated with the parent procedure. For instance, the entity may be a developer of the parent procedure. In accordance with the UI example, the user interface may include a selectable interface element that is configured such that selection of the interface element indicates approval by the entity to implement the change.

In still another example embodiment, performing the remedial action at step 210 includes automatically incorporating a change into the parent procedure. In accordance with this embodiment, the change is configured to reduce the accidental time complexity of the parent procedure.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the method of flowchart 200 further includes detecting an extent to which the parent procedure uses a processor during each of the executions of the parent procedure. In an example implementation, the processor usage logic 418 analyzes the instrumentation data 410 to detect the extent to which the parent procedure uses a processor of the computing device 400 during each of the executions of the parent procedure. For example, the instrumentation data 410 may indicate a number of times the parent procedure accesses the processor of the computing device 400 during each execution of the parent procedure and/or a duration of each access of the processor by the parent procedure during each execution of the parent procedure. In accordance with this example, the extent to which the parent procedure uses the processor during each of the executions of the parent procedure is based at least in part on the number of times the parent procedure accesses the processor during each execution of the parent procedure and/or the duration of each access of the processor by the parent procedure during each execution of the parent procedure.

In an aspect of this implementation, the instrumentation data 410 indicates a time instance at which each access to the processor is initiated by the parent procedure. For instance, the instrumentation data 410 may indicate a start time and an end time of each access of the processor by the parent procedure. By using the instrumentation data 410 to cross-reference each access of the processor by the parent procedure with the execution of the parent procedure during which the access to the processor is initiated, the processor usage logic 418 is able to determine the extent to which the parent procedure uses the processor during each execution of the parent procedure. For instance, the processor usage logic 418 may determine that an access of the processor by the parent procedure is initiated during a particular execution of the parent procedure by determining that the time instance at which the access to the processor is initiated, as indicated by the instrumentation data 410, is within a time period defined by the start time and the end time of the particular execution, as further indicated by the instrumentation data 410. The processor usage logic 418 may determine the duration of each access of the processor by the parent procedure based on the start time and the end time of the respective access, as indicated by the instrumentation data 410. The processor usage logic 418 generates processor usage information 436, which indicates the extent to which the parent procedure uses the processor of the computing device 400 during each of the executions of the parent procedure.

In accordance with this embodiment, the function is based at least in part on the extent to which the parent procedure uses the processor during each of the executions of the parent procedure. For instance, the extent to which the parent procedure uses the processor during an execution of the parent procedure may be based on a number of cycles of the processor that the parent procedure consumes during the execution and/or a number of cores of the processor that the parent procedure uses during the execution.

As shown in FIG. 3, the method of flowchart 300 begins at step 302. In step 302, a number of times the parent procedure calls a child procedure during each of multiple executions of the parent procedure is detected by using the instrumentation to provide call counts for the respective executions. In an example implementation, the call detection logic 412 analyzes instrumentation data 410 to detect the number of times the parent procedure calls the child procedure during each of the executions of the parent procedure to provide the call counts for the respective executions. The instrumentation data 410 indicates a start time and an end time for each execution of the parent procedure. The instrumentation data 410 identifies each call from the parent procedure to the child procedure and indicates during which execution of the parent procedure each call is made to the child procedure. By using the instrumentation data 410 to cross-reference each call that is made from the parent procedure to the child procedure with the execution of the parent procedure during which the call is made, the call detection logic 412 is able to count the number of times the parent procedure calls the child procedure during each of the executions of the parent procedure. In an aspect of this implementation, the instrumentation data 410 indicates a time instance at which each call from the parent procedure to the child procedure is initiated. In accordance with this example, the call detection logic 412 determines that a call from the parent procedure to the child procedure occurs during a particular execution of the parent procedure by determining that the time instance at which the call is initiated, as indicated by the instrumentation data 410, is within a time period defined by the start time and the end time of the particular execution, as further indicated by the instrumentation data 410. The call detection logic 412 generates call count information 430, which indicates the call counts for the respective executions of the parent procedure.

In an example embodiment, detecting the number of times the parent procedure calls the child procedure during each of the executions of the parent procedure at step 302 includes detecting a number of times the parent procedure initiates a network request during each of the executions of the parent procedure, by using the instrumentation, to provide the call counts for the respective executions.

At step 304, an amount of storage that the parent procedure consumes during each of the executions is detected by using the instrumentation to provide storage amounts for the respective executions. For instance, the amount of storage may be a number of bytes of the storage. In an example implementation, the storage detection logic 416 analyzes the instrumentation data 410 to detect the amount of storage that the parent procedure consumes during each of the executions to provide the storage amounts for the respective executions. In an aspect of this implementation, the instrumentation data 410 indicates each time instance at which the parent procedure consumes storage and an amount of the storage that is consumed at the time instance. In accordance with this aspect, the storage detection logic 416 determines that a time instance at which the parent procedure consumes storage occurs during a particular execution of the parent procedure by determining that the time instance at which the parent procedure consumes the storage, as indicated by the instrumentation data 410, is within a time period defined by the start time and the end time of the particular execution, as further indicated by the instrumentation data 410. For each execution of the parent procedure, the storage detection logic 416 sums the amounts of the storage that are consumed at the time instances that are within the time period defined by the start time and the end time of the respective execution to determine the storage amount for the respective execution. The storage detection logic 416 generates storage information 434 to indicate the storage amounts for the respective executions of the parent procedure.

In an example embodiment, detecting the amount of the storage that the parent procedure consumes during each of the executions at step 304 includes detecting an amount of disk space that the parent procedure consumes during each of the executions, by using the instrumentation, to provide the storage amounts for the respective executions.

In another example embodiment, detecting the amount of the storage that the parent procedure consumes during each of the executions at step 304 includes detecting an amount of memory that the parent procedure consumes during each of the executions, by using the instrumentation, to provide the storage amounts for the respective executions. For instance, the memory may be random access memory (RAM).

In yet another example embodiment, detecting the amount of the storage that the parent procedure consumes during each of the executions at step 304 includes detecting an amount of central processing unit (CPU) cache that the parent procedure consumes during each of the executions, by using the instrumentation, to provide the storage amounts for the respective executions.

At step 306, a function (e.g., a mathematical function) is generated that defines a curve that estimates a relationship between the storage amounts for the respective executions and the call counts for the respective executions. In an example implementation, the function generation logic 420 generates the function that defines the curve that estimates the relationship between the storage amounts for the respective executions and the call counts for the respective executions. For instance, the function generation logic 420 may configure the function to define the curve of best fit with regard to the storage amounts for the respective executions and the call counts for the respective executions. The function generation logic 420 generates curve information 426, which includes information about the curve. For instance, the curve information 426 indicates a slope of the curve.

In an example embodiment, the curve estimates a relationship between logarithms of the storage amounts for the respective executions and logarithms of the call counts for the respective executions. Accordingly, the slope of the curve may be calculated by dividing the logarithms of the storage amounts by the logarithms of the call counts.

At step 308, based at least on a slope of the curve that is defined by the function, the accidental storage complexity of the parent procedure is determined. For instance, the accidental storage complexity may be determined based at least in part on the slope of the curve being non-linear. In an example implementation, the slope-based complexity logic 422 determines the accidental storage complexity of the parent procedure based at least on the slope of the curve, which is indicated by the curve information 426. For example, accidental storage complexity of the parent procedure may correspond to (e.g., be defined by) the slope of the curve. In accordance with this example, a slope of one may correspond to (e.g., represent) an accidental time complexity of O(1) using Big O notation; a slope of two may correspond to an accidental time complexity of O(2) using Big O notation, and so on.

In an example embodiment, the accidental storage complexity of the parent procedure is agnostic with regard to inputs that are received at the parent function. In accordance with this embodiment, the inputs to the parent function do not affect the accidental storage complexity.

At step 310, based at least on the accidental storage complexity of the parent procedure satisfying a complexity criterion, a remedial action is performed with regard to the accidental storage complexity. In an example implementation, the remedial action logic 424 performs a remedial action 438 with regard to the accidental storage complexity as a result of the accidental storage complexity of the parent procedure satisfying the complexity criterion. In an aspect of this implementation, the complexity criterion requires the storage complexity to be greater than or equal to a storage complexity threshold. For example, the complexity criterion may require the slope of the curve to be greater than or equal to a slope threshold. The slope threshold may be any suitable value, such as 2, 2.5, or 3). In another example, the complexity criterion may require a non-linearity of the slope to be greater than or equal to a non-linearity threshold. The non-linearity threshold may be quadratic. For instance, the storage complexity threshold may be the slope threshold or the non-linearity threshold.

In an example embodiment, performing the remedial action at step 310 includes triggering a complexity alert, which indicates that the accidental storage complexity of the parent procedure satisfies the complexity criterion. In an aspect of this embodiment, the complexity alert indicates an accidental storage complexity associated with each line of the parent procedure. In another aspect of this embodiment, the complexity alert indicates an accidental storage complexity associated with each line of the parent procedure that causes the accidental storage complexity of the parent procedure to satisfy the complexity criterion.

In another example embodiment, performing the remedial action at step 310 includes generating a notification that indicates a portion of the parent procedure that causes the accidental storage complexity of the parent procedure to satisfy the complexity criterion. In an aspect of this embodiment, generating the notification includes annotating the parent procedure to indicate the portion that causes the accidental storage complexity to satisfy the complexity criterion. For instance, the annotation may be provided proximate the portion.

In yet another example embodiment, performing the remedial action at step 310 includes recommending a change to the parent procedure that is configured to reduce the accidental storage complexity of the parent procedure. In a UI example, a description of the change may be presented via a user interface (e.g., a graphical user interface) of the computing device 400. In an aspect of this embodiment, implementation of the change requires approval of an entity associated with the parent procedure. For instance, the entity may be a developer of the parent procedure. In accordance with the UI example, the user interface may include a selectable interface element that is configured such that selection of the interface element indicates approval by the entity to implement the change.

In still another example embodiment, performing the remedial action at step 310 includes automatically incorporating a change into the parent procedure. In accordance with this embodiment, the change is configured to reduce the accidental storage complexity of the parent procedure.

In some example embodiments, one or more steps 302, 304, 306, 308, and/or 310 of flowchart 300 may not be performed. Moreover, steps in addition to or in lieu of steps 302, 304, 306, 308, and/or 310 may be performed. For instance, in an example embodiment, the method of flowchart 300 further includes detecting an extent to which the parent procedure uses a processor during each of the executions of the parent procedure. In an example implementation, the processor usage logic 418 analyzes the instrumentation data 410 to detect the extent to which the parent procedure uses a processor of the computing device 400 during each of the executions of the parent procedure. For example, the instrumentation data 410 may indicate a number of times the parent procedure accesses the processor of the computing device 400 during each execution of the parent procedure and/or a duration of each access of the processor by the parent procedure during each execution of the parent procedure. In accordance with this example, the extent to which the parent procedure uses the processor during each of the executions of the parent procedure is based at least in part on the number of times the parent procedure accesses the processor during each execution of the parent procedure and/or the duration of each access of the processor by the parent procedure during each execution of the parent procedure.

In an aspect of this implementation, the instrumentation data 410 indicates a time instance at which each access to the processor is initiated by the parent procedure. For instance, the instrumentation data 410 may indicate a start time and an end time of each access of the processor by the parent procedure. By using the instrumentation data 410 to cross-reference each access of the processor by the parent procedure with the execution of the parent procedure during which the access to the processor is initiated, the processor usage logic 418 is able to determine the extent to which the parent procedure uses the processor during each execution of the parent procedure. For instance, the processor usage logic 418 may determine that an access of the processor by the parent procedure is initiated during a particular execution of the parent procedure by determining that the time instance at which the access to the processor is initiated, as indicated by the instrumentation data 410, is within a time period defined by the start time and the end time of the particular execution, as further indicated by the instrumentation data 410. The processor usage logic 418 may determine the duration of each access of the processor by the parent procedure based on the start time and the end time of the respective access, as indicated by the instrumentation data 410. The processor usage logic 418 generates processor usage information 436, which indicates the extent to which the parent procedure uses the processor of the computing device 400 during each of the executions of the parent procedure.

In accordance with this embodiment, the function is based at least in part on the extent to which the parent procedure uses the processor during each of the executions of the parent procedure. For instance, the extent to which the parent procedure uses the processor during an execution of the parent procedure may be based on a number of cycles of the processor that the parent procedure consumes during the execution and/or a number of cores of the processor that the parent procedure uses during the execution.

It will be recognized that the computing system 400 may not include one or more of the instrumentation-based complexity detection logic 408, the call detection logic 412, the time detection logic 414, the storage detection logic 416, the processor usage logic 418, the function generation logic 420, the slope-based complexity logic 422, and/or the remedial action logic 424. Furthermore, the computing system 400 may include components in addition to or in lieu of the instrumentation-based complexity detection logic 408, the call detection logic 412, the time detection logic 414, the storage detection logic 416, the processor usage logic 418, the function generation logic 420, the slope-based complexity logic 422, and/or the remedial action logic 424.

Figure 5:
FIG. 5 depicts an example code snippet, including a parent procedure that exhibits accidental algorithmic complexity, in accordance with an embodiment.

FIG. 5 depicts an example code snippet 500, including a parent procedure that exhibits accidental algorithmic complexity, in accordance with an embodiment. The code snippet 500 defines a first procedure denoted "Function A(N)" and a second procedure denoted "Function B(N)." Function A(N) constitutes a parent procedure that calls Function B(N) N times. Function B(N) constitutes a child procedure that is called by Function A(N). Function B(N) implements a one-second sleep operation N times.

Figure 6:
FIG. 6 is an example table, including measurements associated with the code snippet shown in FIG. 5, in accordance with an embodiment.

FIG. 6 is an example table 600, including measurements associated with the code snippet 500 shown in FIG. 5, in accordance with an embodiment. As shown in FIG. 6, for N=1, the elapsed time of Function A is 1, and the number of times Function A calls Function B (i.e., the call count of Function B in Function A) is 1. For N=2, the elapsed time of Function A is 4, and the number of times Function A calls Function B is 2. For N=3, the elapsed time of Function A is 9, and the number of times Function A calls Function B is 3. For N=4, the elapsed time of Function A is 16, and the number of times Function A calls Function B is 4. For N=5, the elapsed time of Function A is 25, and the number of times Function A calls Function B is 5. In the embodiment of FIG. 6, the slope, m(N), of the curve that estimates the relationship between the elapsed times for the respective executions of Function A and the call counts for the respective executions is m(N)=N^2/N=N. In accordance with this embodiment, a linear slope represents inherent algorithmic complexity, whereas a non-linear slope (e.g., an increasing slope for each successive call count) represents accidental algorithmic complexity. Thus, in accordance with this embodiment, the slope m(N) represents the accidental algorithmic complexity of Function A, which is the accidental time complexity of Function A in this example, because m(N) is non-linear. For example, m(N) increases for each successive call count.

Figure 7:
FIG. 7 depicts an example code snippet, including a parent procedure that exhibits inherent algorithmic complexity, in accordance with an embodiment.

FIG. 7 depicts an example code snippet 700, including a parent procedure that exhibits inherent algorithmic complexity, in accordance with an embodiment. The code snippet 700 defines a first procedure denoted "Function A(N)" and a second procedure denoted "Function B(N)." Function A(N) constitutes a parent procedure that calls Function B(N) N^2 times. Function B(N) constitutes a child procedure that is called by Function A(N). Function B(N) implements a single one-second sleep operation.

Figure 8:
FIG. 8 is an example table, including measurements associated with the code snippet shown in FIG. 7, in accordance with an embodiment.

FIG. 8 is an example table 800, including measurements associated with the code snippet 700 shown in FIG. 7, in accordance with an embodiment. As shown in FIG. 8, for N=1, the elapsed time of Function A is 1, and the number of times Function A calls Function B (i.e., the call count of Function B in Function A) is 1. For N=2, the elapsed time of Function A is 4, and the number of times Function A calls Function B is 4. For N=3, the elapsed time of Function A is 9, and the number of times Function A calls Function B is 9. For N=4, the elapsed time of Function A is 16, and the number of times Function A calls Function B is 16. For N=5, the elapsed time of Function A is 25, and the number of times Function A calls Function B is 25. In the embodiment of FIG. 8, the slope, m(N), of the curve that estimates the relationship between the elapsed times for the respective executions of Function A and the call counts for the respective executions is m(N)=N/N=1. In accordance with this embodiment, the slope m(N) represents inherent algorithmic complexity of Function A, which is the inherent time complexity of Function A in this example, because m(N) is linear. Accordingly, it can be said that Function A as shown in FIG. 7 exhibits no accidental algorithmic complexity.

Figure 9:
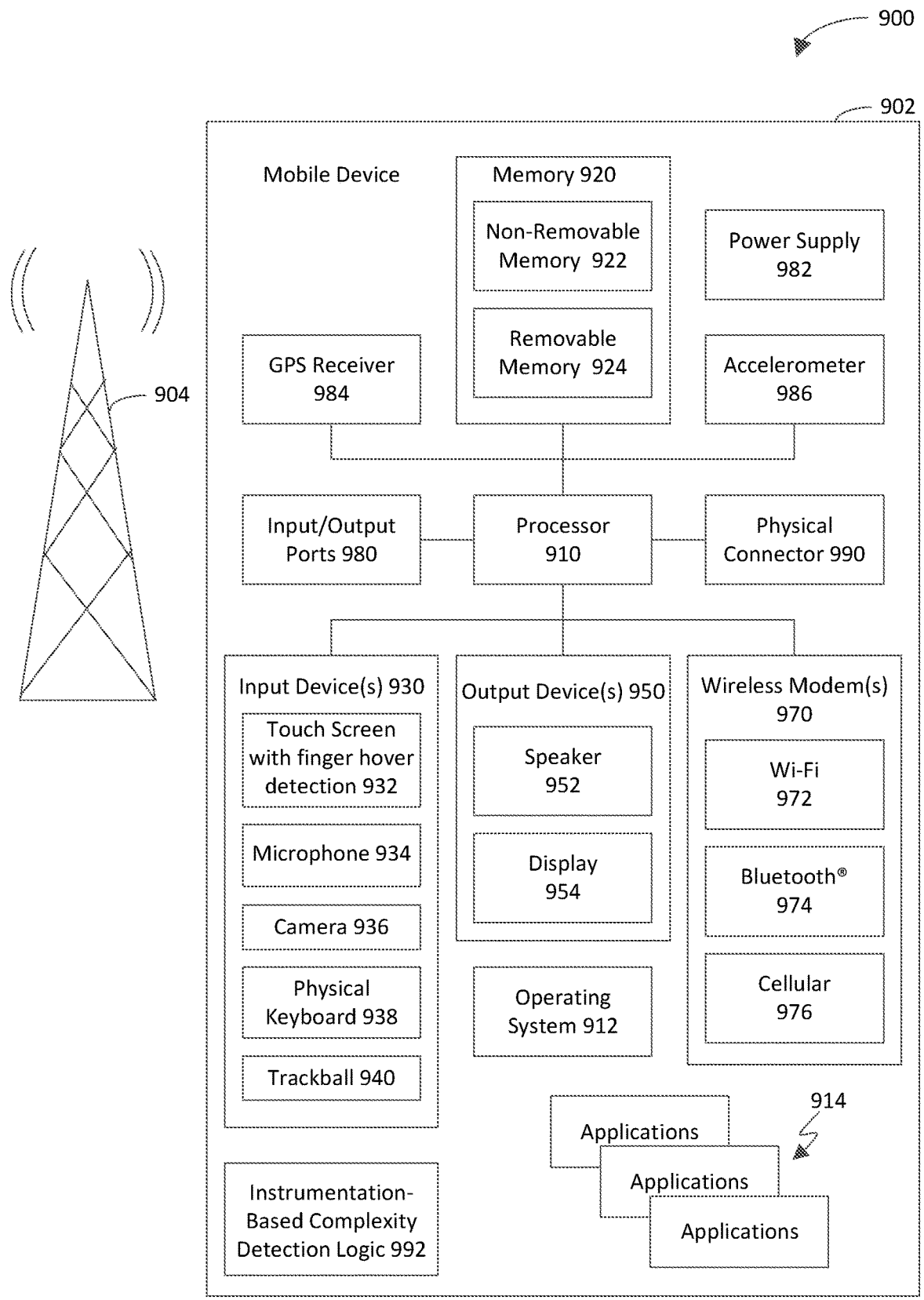
FIG. 9 is a system diagram of an example mobile device in accordance with an embodiment.

FIG. 9 is a system diagram of an example mobile device 900 including a variety of optional hardware and software components, shown generally as 902. Any components 902 in the mobile device may communicate with any other component, though not all connections are shown, for ease of illustration. The mobile device 900 may be any of a variety of computing devices (e.g., cell phone, smartphone, handheld computer, Personal Digital Assistant (PDA), etc.) and may allow wireless two-way communications with one or more mobile communications networks 904, such as a cellular or satellite network, or with a local area or wide area network.

The mobile device 900 includes a processor 910 (e.g., signal processor, microprocessor, ASIC, or other control and processing logic circuitry) for performing such tasks as signal coding, data processing, input/output processing, power control, and/or other functions. An operating system 912 may control the allocation and usage of the components 902 and support for one or more applications 914 (a.k.a. application programs). The applications 914 may include common mobile computing applications (e.g., email applications, calendars, contact managers, web browsers, messaging applications) and any other computing applications (e.g., word processing applications, mapping applications, media player applications).

The mobile device 900 includes instrument-based complexity detection logic 992, which is operable in a manner similar to the instrument-based complexity detection logic 108 described above with reference to FIG. 1 and/or the instrument-based complexity detection logic 408 described above with reference to FIG. 4.

The mobile device 900 includes memory 920. The memory 920 may include non-removable memory 922 and/or removable memory 924. The non-removable memory 922 may include random access memory (RAM), read-only memory (ROM), flash memory, a hard disk, or other well-known memory storage technologies. The removable memory 924 may include flash memory or a Subscriber Identity Module (SIM) card, which is well known in Global System for Mobile Communications (GSM) systems, or other well-known memory storage technologies, such as "smart cards." The memory 920 may store data and/or code for running the operating system 912, the applications 914, and the instrument-based complexity detection logic 992. Example data may include web pages, text, images, sound files, video data, or other data sets to be sent to and/or received from one or more network servers or other devices via one or more wired or wireless networks. Memory 920 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 900 may support one or more input devices 930, such as a touch screen 932, microphone 934, camera 936, physical keyboard 938 and/or trackball 940 and one or more output devices 950, such as a speaker 952 and a display 954. Touch screens, such as the touch screen 932, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 932 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 932 and display 954 may be combined in a single input/output device. The input devices 930 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 may include speech-recognition software as part of a voice control interface that allows a user to operate the mobile device 900 via voice commands. Furthermore, the mobile device 900 may include input devices and software that allows for user interaction via a user's spatial gestures, such as detecting and interpreting gestures to provide input to a gaming application.

Wireless modem(s) 970 may be coupled to antenna(s) (not shown) and may support two-way communications between the processor 910 and external devices, as is well understood in the art. The modem(s) 970 are shown generically and may include a cellular modem 976 for communicating with the mobile communication network 904 and/or other radio-based modems (e.g., Bluetooth® 974 and/or Wi-Fi 972). At least one of the wireless modem(s) 970 is typically configured for communication with one or more cellular networks, such as a GSM network for data and voice communications within a single cellular network, between cellular networks, or between the mobile device and a public switched telephone network (PSTN).

The mobile device may further include at least one input/output port 980, a power supply 982, a satellite navigation system receiver 984, such as a Global Positioning System (GPS) receiver, an accelerometer 986, and/or a physical connector 990, which may be a universal serial bus (USB) port, IEEE 1394 (FireWire) port, and/or RS-232 port. The illustrated components 902 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the instrumentation-based complexity detection logic 108, the instrumentation-based complexity detection logic 408, the call detection logic 412, the time detection logic 414, the storage detection logic 416, the processor usage logic 418, the function generation logic 420, the slope-based complexity logic 422, the remedial action logic 424, flowchart 200, and/or flowchart 300 may be implemented in hardware, software, firmware, or any combination thereof.

For example, any one or more of the instrumentation-based complexity detection logic 108, the instrumentation-based complexity detection logic 408, the call detection logic 412, the time detection logic 414, the storage detection logic 416, the processor usage logic 418, the function generation logic 420, the slope-based complexity logic 422, the remedial action logic 424, flowchart 200, and/or flowchart 300 may be implemented, at least in part, as computer program code configured to be executed in one or more processors.

In another example, any one or more of the instrumentation-based complexity detection logic 108, the instrumentation-based complexity detection logic 408, the call detection logic 412, the time detection logic 414, the storage detection logic 416, the processor usage logic 418, the function generation logic 420, the slope-based complexity logic 422, the remedial action logic 424, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
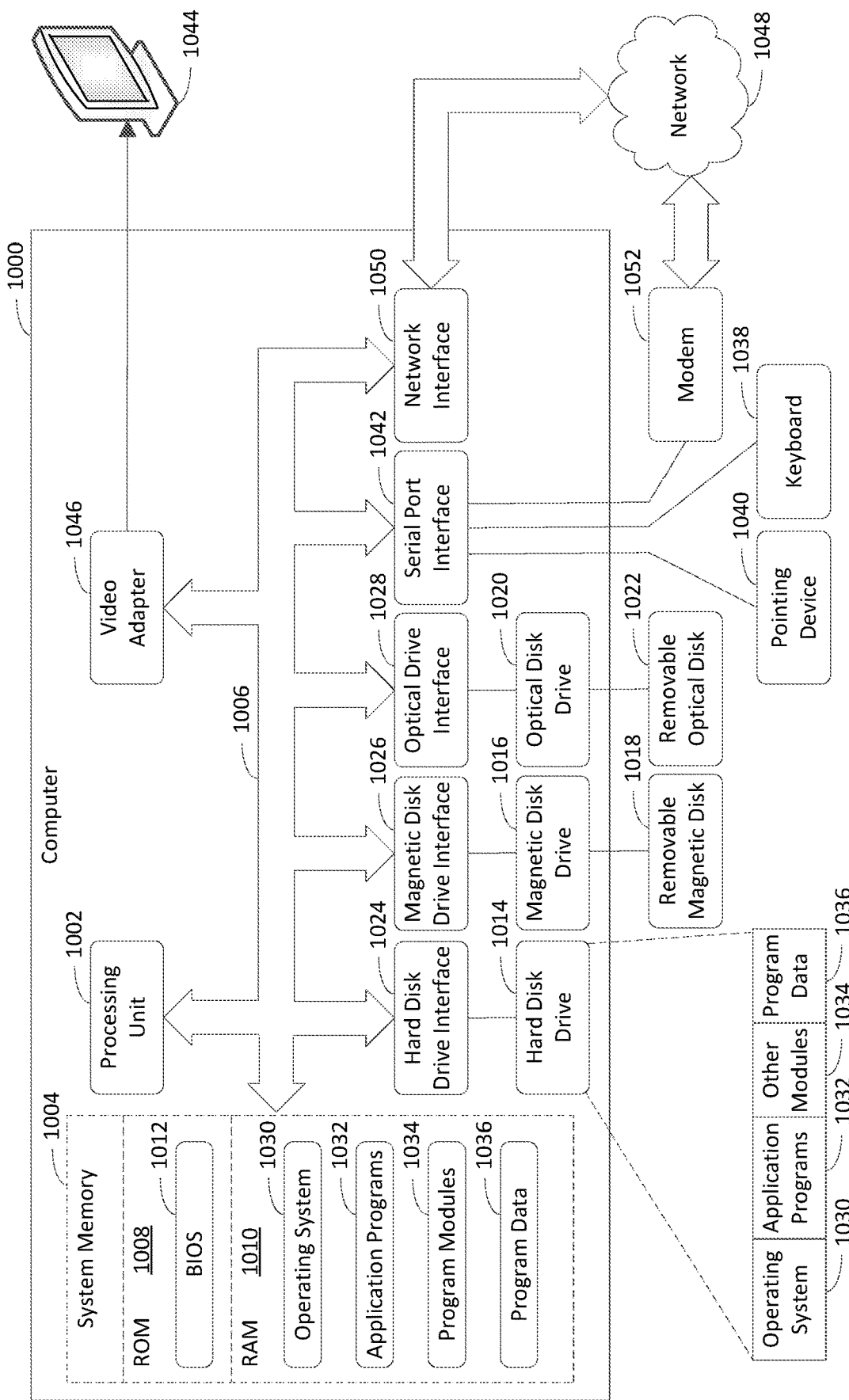
FIG. 10 depicts an example computer in which embodiments may be implemented.

II. Further Discussion of Some Example Embodiments (A1) A first example system (FIG. 1, 102A-102M, 106A-106N; FIG. 4, 400; FIG. 9, 902; FIG. 10, 1000) comprises memory (FIG. 9, 920, 922, 924; FIG. 10, 1004, 1008, 1010) and a processing system (FIG. 9, 910; FIG. 10, 1002) coupled to the memory. The processing system is configured to detect (FIG. 2, 202) a number of times a parent procedure calls a child procedure during each of multiple executions of the parent procedure, by using instrumentation, to provide call counts for the respective executions. The processing system is further configured to detect (FIG. 2, 204) an amount of time that the parent procedure executes during each of the executions, by using the instrumentation, to provide elapsed times for the respective executions. The processing system is further configured to generate (FIG. 2, 206) a function that defines a curve that estimates a relationship between the elapsed times for the respective executions and the call counts for the respective executions. The processing system is further configured to, based at least on a slope of the curve that is defined by the function, determine (FIG. 2, 208) accidental time complexity of the parent procedure. The processing system is further configured to, based at least on the accidental time complexity of the parent procedure satisfying a complexity criterion, perform (FIG. 2, 210) a remedial action (FIG. 4, 438) with regard to the accidental time complexity.

(A2) In the example system of A1, wherein the processing system is configured to: detect a number of times the parent procedure initiates a network request during each of the executions of the parent procedure, by using the instrumentation, to provide the call counts for the respective executions.

(A3) In the example system of any of A1-A2, wherein the processing system is configured to: detect an extent to which the parent procedure uses a processor during each of the executions of the parent procedure; and wherein the function is based at least in part on the extent to which the parent procedure uses the processor during each of the executions of the parent procedure.

(A4) In the example system of any of A1-A3, wherein the curve estimates a relationship between logarithms of the elapsed times for the respective executions and logarithms of the call counts for the respective executions.

(A5) In the example system of any of A1-A4, wherein the accidental time complexity of the parent procedure is agnostic with regard to inputs that are received at the parent function.

(A6) In the example system of any of A1-A5, wherein the processing system is configured to perform the remedial action by triggering a complexity alert, which indicates that the accidental time complexity of the parent procedure satisfies the complexity criterion.

(A7) In the example system of any of A1-A6, wherein the processing system is configured to perform the remedial action by generating a notification that indicates a portion of the parent procedure that causes the accidental time complexity of the parent procedure to satisfy the complexity criterion.

(A8) In the example system of any of A1-A7, wherein the processing system is configured to perform the remedial action by recommending a change to the parent procedure that is configured to reduce the accidental time complexity of the parent procedure.

(A9) In the example system of any of A1-A8, wherein the processing system is configured to perform the remedial action by automatically incorporating a change into the parent procedure, the change configured to reduce the accidental time complexity of the parent procedure.

(B1) A second example system (FIG. 1, 102A-102M, 106A-106N; FIG. 4, 400; FIG. 9, 902; FIG. 10, 1000) comprises memory (FIG. 9, 920, 922, 924; FIG. 10, 1004, 1008, 1010) and a processing system (FIG. 9, 910; FIG. 10, 1002) coupled to the memory. The processing system is configured to detect (FIG. 3, 302) a number of times a parent procedure calls a child procedure during each of multiple executions of the parent procedure, by using instrumentation, to provide call counts for the respective executions. The processing system is further configured to detect (FIG. 3, 304) an amount of storage that the parent procedure consumes during each of the executions, by using the instrumentation, to provide storage amounts for the respective executions. The processing system is further configured to generate (FIG. 3, 306) a function that defines a curve that estimates a relationship between the storage amounts for the respective executions and the call counts for the respective executions. The processing system is further configured to, based at least on a slope of the curve that is defined by the function, determine (FIG. 3, 308) accidental storage complexity of the parent procedure. The processing system is further configured to, based at least on the accidental storage complexity of the parent procedure satisfying a complexity criterion, perform (FIG. 3, 310) a remedial action (FIG. 4, 438) with regard to the accidental storage complexity.

(B2) In the example system of B1, wherein the processing system is configured to: detect a number of times the parent procedure initiates a network request during each of the executions of the parent procedure, by using the instrumentation, to provide the call counts for the respective executions.

(B3) In the example system of any of B1-B2, wherein the processing system is configured to: detect an extent to which the parent procedure uses a processor during each of the executions of the parent procedure; and wherein the function is based at least in part on the extent to which the parent procedure uses the processor during each of the executions of the parent procedure.

(B4) In the example system of any of B1-B3, wherein the processing system is configured to: detect an amount of disk space that the parent procedure consumes during each of the executions, by using the instrumentation, to provide the storage amounts for the respective executions.

(B5) In the example system of any of B1-B4, wherein the processing system is configured to: detect an amount of memory that the parent procedure consumes during each of the executions, by using the instrumentation, to provide the storage amounts for the respective executions.

(B6) In the example system of any of B1-B5, wherein the processing system is configured to: detect an amount of central processing unit cache that the parent procedure consumes during each of the executions, by using the instrumentation, to provide the storage amounts for the respective executions.

(B7) In the example system of any of B1-B6, wherein the curve estimates a relationship between logarithms of the storage amounts for the respective executions and logarithms of the call counts for the respective executions.

(B8) In the example system of any of B1-B7, wherein the accidental storage complexity of the parent procedure is agnostic with regard to inputs that are received at the parent function.

(B9) In the example system of any of B1-B8, wherein the processing system is configured to perform the remedial action by triggering a complexity alert, which indicates that the accidental storage complexity of the parent procedure satisfies the complexity criterion.

(B10) In the example system of any of B1-B9, wherein the processing system is configured to perform the remedial action by generating a notification that indicates a portion of the parent procedure that causes the accidental storage complexity of the parent procedure to satisfy the complexity criterion.

(B11) In the example system of any of B1-B10, wherein the processing system is configured to perform the remedial action by recommending a change to the parent procedure that is configured to reduce the accidental storage complexity of the parent procedure.

(B12) In the example system of any of B1-B11, wherein the processing system is configured to perform the remedial action by automatically incorporating a change into the parent procedure, the change configured to reduce the accidental storage complexity of the parent procedure.

(C1) A first example method is implemented by a computing system (FIG. 1, 102A-102M, 106A-106N; FIG. 4, 400; FIG. 9, 902; FIG. 10, 1000). The method comprises detecting (FIG. 2, 202) a number of times a parent procedure calls a child procedure during each of multiple executions of the parent procedure, by using instrumentation, to provide call counts for the respective executions. The method further comprises detecting (FIG. 2, 204) an amount of time that the parent procedure executes during each of the executions, by using the instrumentation, to provide elapsed times for the respective executions. The method further comprises generating (FIG. 2, 206) a function that defines a curve that estimates a relationship between the elapsed times for the respective executions and the call counts for the respective executions. The method further comprises, based at least on a slope of the curve that is defined by the function, determining (FIG. 2, 208) accidental time complexity of the parent procedure. The method further comprises, based at least on the accidental time complexity of the parent procedure satisfying a complexity criterion, performing (FIG. 2, 210) a remedial action (FIG. 4, 438) with regard to the accidental time complexity.

(C2) In the method of C1, wherein detecting the number of times the parent procedure calls a child procedure during each of the executions of the parent procedure comprises:

detecting a number of times the parent procedure initiates a network request during each of the executions of the parent procedure, by using the instrumentation, to provide the call counts for the respective executions.

(C3) In the method of any of C1-C2, comprising: detecting an extent to which the parent procedure uses a processor during each of the executions of the parent procedure; wherein the function is based at least in part on the extent to which the parent procedure uses the processor during each of the executions of the parent procedure.

(C4) In the method of any of C1-C3, wherein the curve estimates a relationship between logarithms of the elapsed times for the respective executions and logarithms of the call counts for the respective executions.

(C5) In the method of any of C1-C4, wherein the accidental time complexity of the parent procedure is agnostic with regard to inputs that are received at the parent function.

(C6) In the method of any of C1-C5, wherein performing the remedial action comprises: triggering a complexity alert, which indicates that the accidental time complexity of the parent procedure satisfies the complexity criterion.

(C7) In the method of any of C1-C6, wherein performing the remedial action comprises: generating a notification that indicates a portion of the parent procedure that causes the accidental time complexity of the parent procedure to satisfy the complexity criterion.

(C8) In the method of any of C1-C7, wherein performing the remedial action comprises: recommending a change to the parent procedure that is configured to reduce the accidental time complexity of the parent procedure.

(C9) In the method of any of C1-C8, wherein performing the remedial action comprises: automatically incorporating a change into the parent procedure, the change configured to reduce the accidental time complexity of the parent procedure.

(D1) A second example method is implemented by a computing system (FIG. 1, 102A-102M, 106A-106N; FIG. 4, 400; FIG. 9, 902; FIG. 10, 1000). The method comprises detecting (FIG. 2, 202) a number of times a parent procedure calls a child procedure during each of multiple executions of the parent procedure, by using instrumentation, to provide call counts for the respective executions. The method further comprises detecting (FIG. 2, 204) an amount of storage that the parent procedure consumes during each of the executions, by using the instrumentation, to provide storage amounts for the respective executions. The method further comprises generating (FIG. 2, 206) a function that defines a curve that estimates a relationship between the storage amounts for the respective executions and the call counts for the respective executions. The method further comprises, based at least on a slope of the curve that is defined by the function, determining (FIG. 2, 208) accidental storage complexity of the parent procedure. The method further comprises, based at least on the accidental storage complexity of the parent procedure satisfying a complexity criterion, performing (FIG. 2, 210) a remedial action (FIG. 4, 438) with regard to the accidental storage complexity.

(D2) In the method of D1, wherein detecting the number of times the parent procedure calls a child procedure during each of the executions of the parent procedure comprises: detecting a number of times the parent procedure initiates a network request during each of the executions of the parent procedure, by using the instrumentation, to provide the call counts for the respective executions.

(D3) In the method of any of D1-D2, comprising: detecting an extent to which the parent procedure uses a processor during each of the executions of the parent procedure; wherein the function is based at least in part on the extent to which the parent procedure uses the processor during each of the executions of the parent procedure.

(D4) In the method of any of D1-D3, wherein detecting the amount of the storage that the parent procedure consumes during each of the executions comprises: detecting an amount of disk space that the parent procedure consumes during each of the executions, by using the instrumentation, to provide the storage amounts for the respective executions.

(D5) In the method of any of D1-D4, wherein detecting the amount of the storage that the parent procedure consumes during each of the executions comprises: detecting an amount of memory that the parent procedure consumes during each of the executions, by using the instrumentation, to provide the storage amounts for the respective executions.

(D6) In the method of any of D1-D5, wherein detecting the amount of the storage that the parent procedure consumes during each of the executions comprises: detecting an amount of central processing unit cache that the parent procedure consumes during each of the executions, by using the instrumentation, to provide the storage amounts for the respective executions.

(D7) In the method of any of D1-D6, wherein the curve estimates a relationship between logarithms of the storage amounts for the respective executions and logarithms of the call counts for the respective executions.

(D8) In the method of any of D1-D7, wherein the accidental storage complexity of the parent procedure is agnostic with regard to inputs that are received at the parent function.

(D9) In the method of any of D1-D8, wherein performing the remedial action comprises: triggering a complexity alert, which indicates that the accidental storage complexity of the parent procedure satisfies the complexity criterion.

(D10) In the method of any of D1-D9, wherein performing the remedial action comprises: generating a notification that indicates a portion of the parent procedure that causes the accidental storage complexity of the parent procedure to satisfy the complexity criterion.

(D11) In the method of any of D1-D10, wherein performing the remedial action comprises: recommending a change to the parent procedure that is configured to reduce the accidental storage complexity of the parent procedure.

(D12) In the method of any of D1-D11, wherein performing the remedial action comprises: automatically incorporating a change into the parent procedure, the change configured to reduce the accidental storage complexity of the parent procedure.

(E1) A first example computer program product (FIG. 9, 924; FIG. 10, 1018, 1022) comprising a computer-readable storage medium having instructions recorded thereon for enabling a processor-based system (FIG. 1, 102A-102M, 106A-106N; FIG. 4, 400; FIG. 9, 902; FIG. 10, 1000) to perform operations. The operations comprise detecting (FIG. 2, 202) a number of times a parent procedure calls a child procedure during each of multiple executions of the parent procedure, by using instrumentation, to provide call counts for the respective executions. The operations further comprise detecting (FIG. 2, 204) an amount of time that the parent procedure executes during each of the executions, by using the instrumentation, to provide elapsed times for the respective executions. The operations further comprise generating (FIG. 2, 206) a function that defines a curve that estimates a relationship between the elapsed times for the respective executions and the call counts for the respective executions. The operations further comprise, based at least on a slope of the curve that is defined by the function, determining (FIG. 2, 208) accidental time complexity of the parent procedure. The operations further comprise, based at least on the accidental time complexity of the parent procedure satisfying a complexity criterion, performing (FIG. 2, 210) a remedial action with regard to the accidental time complexity.

(F1) A second example computer program product (FIG. 9, 924; FIG. 10, 1018, 1022) comprising a computer-readable storage medium having instructions recorded thereon for enabling a processor-based system (FIG. 1, 102A-102M, 106A-106N; FIG. 4, 400; FIG. 9, 902; FIG. 10, 1000) to perform operations. The operations comprise detecting (FIG. 3, 302) a number of times a parent procedure calls a child procedure during each of multiple executions of the parent procedure, by using instrumentation, to provide call counts for the respective executions. The operations further comprise detecting (FIG. 3, 304) an amount of storage that the parent procedure consumes during each of the executions, by using the instrumentation, to provide storage amounts for the respective executions. The operations further comprise generating (FIG. 3, 306) a function that defines a curve that estimates a relationship between the storage amounts for the respective executions and the call counts for the respective executions. The operations further comprise, based at least on a slope of the curve that is defined by the function, determining (FIG. 3, 308) accidental storage complexity of the parent procedure. The operations further comprise, based at least on the accidental storage complexity of the parent procedure satisfying a complexity criterion, performing (FIG. 3, 310) a remedial action (FIG. 4, 438) with regard to the accidental storage complexity.

III. Example Computer System

FIG. 10 depicts an example computer 1000 in which embodiments may be implemented. Any one or more of the user devices 102A-102M and/or any one or more of the servers 106A-106N shown in FIG. 1 and/or the computing system 400 shown in FIG. 4 may be implemented using computer 1000, including one or more features of computer 1000 and/or alternative features. Computer 1000 may be a general-purpose computing device in the form of a conventional personal computer, a mobile computer, or a workstation, for example, or computer 1000 may be a special purpose computing device. The description of computer 1000 provided herein is provided for purposes of illustration, and is not intended to be limiting. Embodiments may be implemented in further types of computer systems, as would be known to persons skilled in the relevant art(s).

As shown in FIG. 10, computer 1000 includes a processing unit 1002, a system memory 1004, and a bus 1006 that couples various system components including system memory 1004 to processing unit 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic for implementing any one or more of (e.g., at least a portion of) the instrumentation-based complexity detection logic 108, the instrumentation-based complexity detection logic 408, the call detection logic 412, the time detection logic 414, the storage detection logic 416, the processor usage logic 418, the function generation logic 420, the slope-based complexity logic 422, the remedial action logic 424, flowchart 200 (including any step of flowchart 200), and/or flowchart 300 (including any step of flowchart 300), as described herein.

A user may enter commands and information into the computer 1000 through input devices such as keyboard 1038 and pointing device 1040. Other input devices (not shown) may include a microphone, joystick, game pad, satellite dish, scanner, touch screen, camera, accelerometer, gyroscope, or the like. These and other input devices are often connected to the processing unit 1002 through a serial port interface 1042 that is coupled to bus 1006, but may be connected by other interfaces, such as a parallel port, game port, or a universal serial bus (USB).

A display device 1044 (e.g., a monitor) is also connected to bus 1006 via an interface, such as a video adapter 1046. In addition to display device 1044, computer 1000 may include other peripheral output devices (not shown) such as speakers and printers.

Computer 1000 is connected to a network 1048 (e.g., the Internet) through a network interface or adapter 1050, a modem 1052, or other means for establishing communications over the network. Modem 1052, which may be internal or external, is connected to bus 1006 via serial port interface 1042.

As used herein, the terms "computer program medium" and "computer-readable storage medium" are used to generally refer to media (e.g., non-transitory media) such as the hard disk associated with hard disk drive 1014, removable magnetic disk 1018, removable optical disk 1022, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050 or serial port interface 1042. Such computer programs, when executed or loaded by an application, enable computer 1000 to implement features of embodiments discussed herein. Accordingly, such computer programs represent controllers of the computer 1000.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   a processing system coupled to the memory, the processing system configured to:
      detect a number of times a parent procedure calls a child procedure during each of multiple executions of the parent procedure, by using instrumentation, to provide call counts for the respective executions;
      detect an amount of time that the parent procedure executes during each of the executions, by using the instrumentation, to provide elapsed times for the respective executions;
      generate a function that defines a curve that estimates a relationship between the elapsed times for the respective executions and the call counts for the respective executions;
      based at least on a slope of the curve that is defined by the function, determine accidental time complexity of the parent procedure; and
      based at least on the accidental time complexity of the parent procedure satisfying a complexity criterion, perform a remedial action with regard to the accidental time complexity.

2. The system of claim 1, wherein the processing system is configured to:
   detect a number of times the parent procedure initiates a network request during each of the executions of the parent procedure, by using the instrumentation, to provide the call counts for the respective executions.

3. The system of claim 1, wherein the processing system is configured to:
   detect an extent to which the parent procedure uses a processor during each of the executions of the parent procedure; and
   wherein the function is based at least in part on the extent to which the parent procedure uses the processor during each of the executions of the parent procedure.

4. The system of claim 1, wherein the curve estimates a relationship between logarithms of the elapsed times for the respective executions and logarithms of the call counts for the respective executions.

5. The system of claim 1, wherein the accidental time complexity of the parent procedure is agnostic with regard to inputs that are received at the parent function.

6. The system of claim 1, wherein the processing system is configured to perform the remedial action by triggering a complexity alert, which indicates that the accidental time complexity of the parent procedure satisfies the complexity criterion.

7. The system of claim 1, wherein the processing system is configured to perform the remedial action by generating a notification that indicates a portion of the parent procedure that causes the accidental time complexity of the parent procedure to satisfy the complexity criterion.

8. The system of claim 1, wherein the processing system is configured to perform the remedial action by recommending a change to the parent procedure that is configured to reduce the accidental time complexity of the parent procedure.

9. The system of claim 1, wherein the processing system is configured to perform the remedial action by automatically incorporating a change into the parent procedure, the change configured to reduce the accidental time complexity of the parent procedure.

10. A method implemented by a computing system, the method comprising:
   detecting a number of times a parent procedure calls a child procedure during each of multiple executions of the parent procedure, by using instrumentation, to provide call counts for the respective executions;
   detecting an amount of storage that the parent procedure consumes during each of the executions, by using the instrumentation, to provide storage amounts for the respective executions;
   generating a function that defines a curve that estimates a relationship between the storage amounts for the respective executions and the call counts for the respective executions;
   based at least on a slope of the curve that is defined by the function, determining accidental storage complexity of the parent procedure; and
   based at least on the accidental storage complexity of the parent procedure satisfying a complexity criterion, performing a remedial action with regard to the accidental storage complexity.

11. The method of claim 10, wherein detecting the number of times the parent procedure calls a child procedure during each of the executions of the parent procedure comprises:
   detecting a number of times the parent procedure initiates a network request during each of the executions of the parent procedure, by using the instrumentation, to provide the call counts for the respective executions.

12. The method of claim 10, comprising:
   detecting an extent to which the parent procedure uses a processor during each of the executions of the parent procedure;
   wherein the function is based at least in part on the extent to which the parent procedure uses the processor during each of the executions of the parent procedure.

13. The method of claim 10, wherein detecting the amount of the storage that the parent procedure consumes during each of the executions comprises:
   detecting an amount of disk space that the parent procedure consumes during each of the executions, by using the instrumentation, to provide the storage amounts for the respective executions.

14. The method of claim 10, wherein detecting the amount of the storage that the parent procedure consumes during each of the executions comprises:
   detecting an amount of memory that the parent procedure consumes during each of the executions, by using the instrumentation, to provide the storage amounts for the respective executions.

15. The method of claim 10, wherein detecting the amount of the storage that the parent procedure consumes during each of the executions comprises:
   detecting an amount of central processing unit cache that the parent procedure consumes during each of the executions, by using the instrumentation, to provide the storage amounts for the respective executions.

16. The method of claim 10, wherein the curve estimates a relationship between logarithms of the storage amounts for the respective executions and logarithms of the call counts for the respective executions.

17. The method of claim 10, wherein the accidental storage complexity of the parent procedure is agnostic with regard to inputs that are received at the parent function.

18. The method of claim 10, wherein performing the remedial action comprises:
   triggering a complexity alert, which indicates that the accidental storage complexity of the parent procedure satisfies the complexity criterion.

19. The method of claim 10, wherein performing the remedial action comprises:
   generating a notification that indicates a portion of the parent procedure that causes the accidental storage complexity of the parent procedure to satisfy the complexity criterion.

20. The method of claim 10, wherein performing the remedial action comprises:
   recommending a change to the parent procedure that is configured to reduce the accidental storage complexity of the parent procedure.

21. The method of claim 10, wherein performing the remedial action comprises:
   automatically incorporating a change into the parent procedure, the change configured to reduce the accidental storage complexity of the parent procedure.

22. A computer program product comprising a computer-readable storage medium having instructions recorded thereon for enabling a processor-based system to perform operations, the operations comprising:
   detecting a number of times a parent procedure calls a child procedure during each of multiple executions of the parent procedure, by using instrumentation, to provide call counts for the respective executions;
   detecting an amount of storage that the parent procedure consumes during each of the executions, by using the instrumentation, to provide storage amounts for the respective executions;
   generating a function that defines a curve that estimates a relationship between the storage amounts for the respective executions and the call counts for the respective executions;
   based at least on a slope of the curve that is defined by the function, determining accidental storage complexity of the parent procedure; and
   based at least on the accidental storage complexity of the parent procedure satisfying a complexity criterion, performing a remedial action with regard to the accidental storage complexity.

* * * * *